Sept. 4, 1962 P. BOESE ET AL 3,052,411

COMPUTER

Filed Oct. 24, 1960 4 Sheets-Sheet 1

Inventors
Peter Boese
Elmar Götz
by: George M. Spencer
Attorney

COMPUTER

Filed Oct. 24, 1960 4 Sheets-Sheet 2

Inventors
Peter Boese
Elmar Götz
by: George H. Spencer
Attorney

COMPUTER

Filed Oct. 24, 1960 4 Sheets-Sheet 3

Inventors
Peter Boese
Elmar Götz
by: George H. Spencer
Attorney

Inventors
Peter Boese
Elmar Götz
by: George H. Spencer
Attorney

United States Patent Office 3,052,411
Patented Sept. 4, 1962

3,052,411
COMPUTER

Peter Boese and Elmar Götz, Berlin-Frohnau, Germany, assignors to Licentia Patent-Verwaltungs-G.m.b.H., Frankfurt am Main, Germany Filed Oct. 24, 1960, Ser. No. 64,365
Claims priority, application Germany Oct. 27, 1959
12 Claims. (Cl. 235—155)

The present invention relates to digital computers.

More particularly, the present invention relates to a method and apparatus for changing a binary number into its equivalent decimal number and for indicating such decimal number.

For numerical control of electronic computing machines, the computers generally use the binary numbering system. Such system is also used, for example, in the transmission of electrical data. The binary numbering system is particularly advantageous for computing operations and transmission since the information represented by the bits of binary information can be handled by very simple binary networks.

However, in order to obtain the information from the computers or from the transmitted data, it is the decimal numbering system which is most generally desired, mainly because the operators utilizing the data and information supplied from the computers are accustomed to handling numbers in the decimal system. Therefore, it becomes necessary to convert the numbers presented in the binary numbering system to the equivalent decimal numbers.

In our previous co-pending patent application Serial No. 46,133, filed July 29, 1960, we presented a method and apparatus for converting the decimal numbers into equivalent binary numbers. Such a system is used when the information is to be transmitted or be fed into computing apparatus. In the present application, the reverse situation is treated.

In order to perform the conversion from the binary to the decimal system, diode matrices are normally used. Unfortunately, such matrices can be used for only a relatively small number of inputs and outputs, so that a very large number of matrices would be necessary to perform this conversion function. In the more complicated computing machines in use today, there are many computing operations so that a large number of diode matrices would be essential for conventional methods. During the calculating operations in the conventional systems, the single bits of information must be transformed into the equivalent decimal numbers and then, after the calculations are carried out, the decimal numbers are separately added.

Accordingly, it is an object of the present invention to provide a new and improved method and apparatus for converting a binary number into its equivalent decimal number without any of the disadvantages of the previously known and conventional methods and apparatus.

Another object of the present invention is to provide a new and improved method and apparatus for converting a binary number into a decimal number utilizing a very small number of component elements.

With the above objects and advantages in view, the present invention resides mainly in a method for converting a binary number having a plurality of bits of information into a binary coded decimal number having a plurality of binary coded decades, which method includes as the first step that of storing the most significant bit of the binary number in the $2^0$ position of the lowest order binary coded decade, as the second step that of subtracting the binary coded decimal number 0 from the binary coded decimal number stored in the lowest order decade when the last-mentioned number is less than 5 and generating a binary 0 to carry to the next highest decade, as the third step that of subtracting the binary coded decimal number 5 from the binary coded decimal number stored in the lowest order decade when the last-mentioned number is greater than 4 and less than 10 and generating a binary 1 to carry to the next highest decade, as the fourth step that of doubling the binary coded decimal number representing the difference of the subtraction and storing the result in the lowest order decade, and repeating the first four steps for each of the next most significant bits in order until the least significant bit is stored in the lowest order binary coded decade.

In a preferred method of carrying out the present invention, the binary coded decimal number is further converted into its equivalent decimal number.

In a preferred embodiment of the instant invention, the binary number is changed into the binary coded decimal number by means of a plurality of shift registers, each of the registers corresponding respectively to one of the decades of the binary coded decimal number to be produced, means for sequentially introducing each of the bits of information of the binary number into the $2^0$ position of the first shift register representing the lowest order decade, the bits being introduced in sequence from the most significant bit to the least significant bit, and subtraction means effective each time a bit is so introduced for subtracting the binary coded decimal number 0 from the binary coded decimal number stored in the first shift register when the last-mentioned number is less than 5 and for applying the binary 0 to the second shift register representing the next highest order decade, for subtracting the binary coded decimal number 5 from the binary coded decimal number stored in the first shift register when the last-mentioned number is more than 4 and less than 10 and for applying the binary 1 to the second shift register, and for storing the binary coded decimal number representing the difference of the subtraction in the first shift register, before the next most significant bit is introduced, in such a manner that the value of the last-mentioned binary coded decimal number is doubled.

Additional objects and advantages of the present invention will become apparent upon consideration of the following description when taken in conjunction with the accompanying drawings in which:

FIGURE 1 is an electrical schematic diagram showing the interconnections between each of the individual elements of the apparatus incorporating the principles of the present invention for converting the binary number into its equivalent decimal number.

FIGURE 2 contains representations of the timing wave forms generated by the time controlling elements of the system illustrated in FIGURE 1 during a complete operating cycle of the conversion apparatus.

Figure 1:
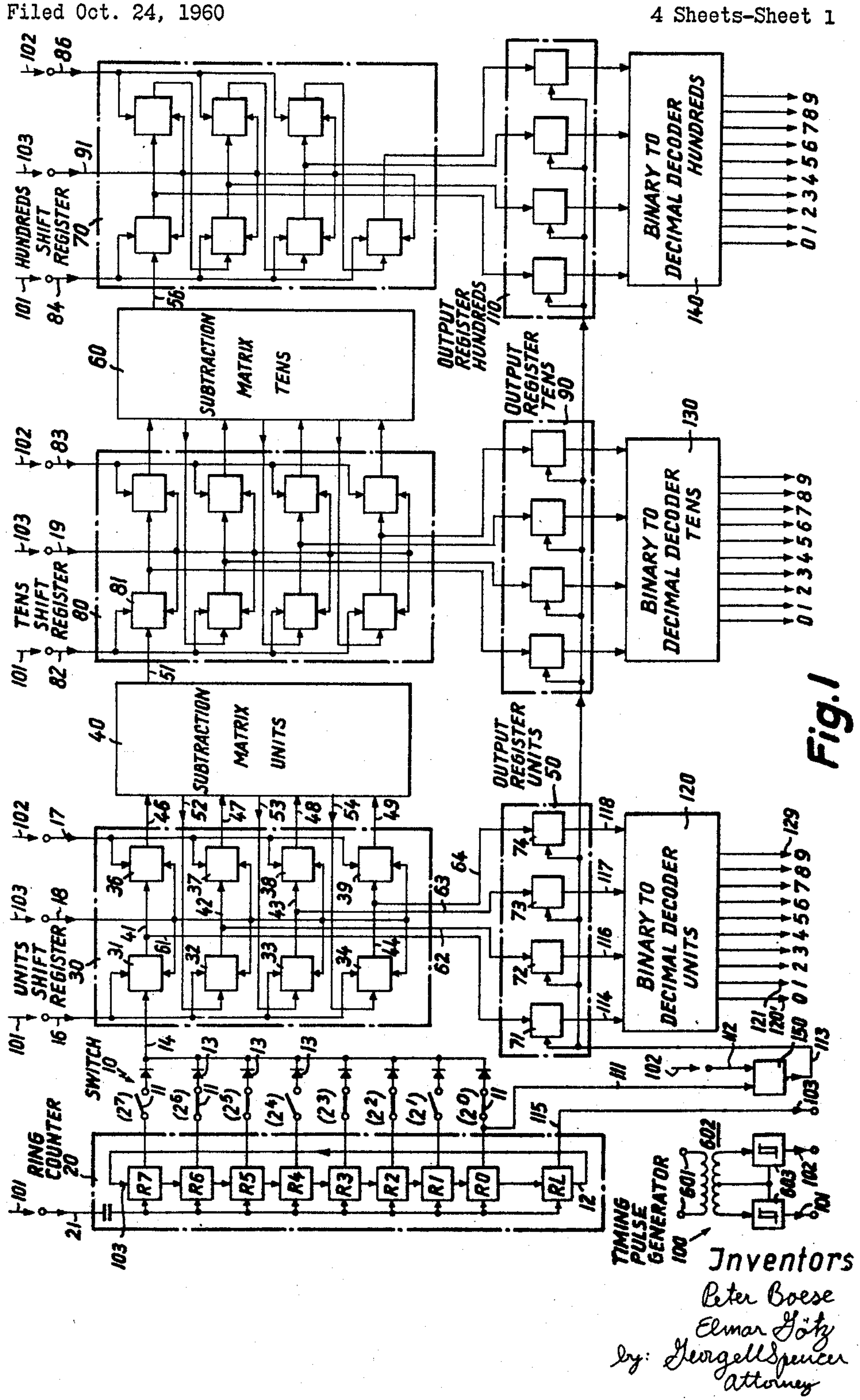

The methods practiced by the apparatus in accordance with the principles of the present invention will first be explained, whereafter a complete detailed description of the operation of the various circuit elements of the instant invention will be presented. Furthermore, an illustrated example of such arrangement will be provided so as better to understand the complete operation and method practiced by the apparatus.

In this invention, the following algorism is used: The binary number is presented as bits of information either having the binary 0 or the binary 1 in each of its positions. In accordance with the present invention, the operation is begun with the most significant bit. If this bit is the binary 1, this produces a decimal number which is to be stored; this number is doubled to 2 and the result stored. If the next most significant bit of the binary number is the binary 1, then the previous result 2 is added to 1 giving the result 3, which is stored. If, however, the next most significant bit had been the binary 0, then the 0 would have been added to the 2 still providing the result 2. The result which has been added to the next most significant bit is then doubled, in accordance with the next step, to provide a new result. This new result is then added to the next most significant bit to provide a new result, which is again doubled. These steps continue until the last result is added to the least significant bit of the binary number to present the end result.

As an illustrative example, the following 8 position binary number will be utilized: 01101101. This corresponds to the $2^7$, $2^6$, $2^5$, $2^4$, $2^3$, $2^2$, $2^1$ and $2^0$ positions of the binary number. If it is desired to transform this binary number into a corresponding decimal number utilizing the above described algorism, the following would be the result:

($2^7$) Binary 0, no operation
($2^6$) Binary 1, the result is 1; doubled=2
($2^5$) Binary 1, the result is 2+1=3; doubled=6
($2^4$) Binary 0, the result is 6+0=6; doubled=12
($2^3$) Binary 1, the result is 12+1=13; doubled=26
($2^2$) Binary 1, the result is 26+1=27; doubled=54
($2^1$) Binary 0, the result is 54+0=54; doubled=108
($2^0$) Binary 1, the result is 108+1=109; end result.

Thus, the binary number 01101101 corresponds to the decimal number 109.

In accordance with the present invention, an apparatus will be set forth which carries out this algorism.

Figure 2:
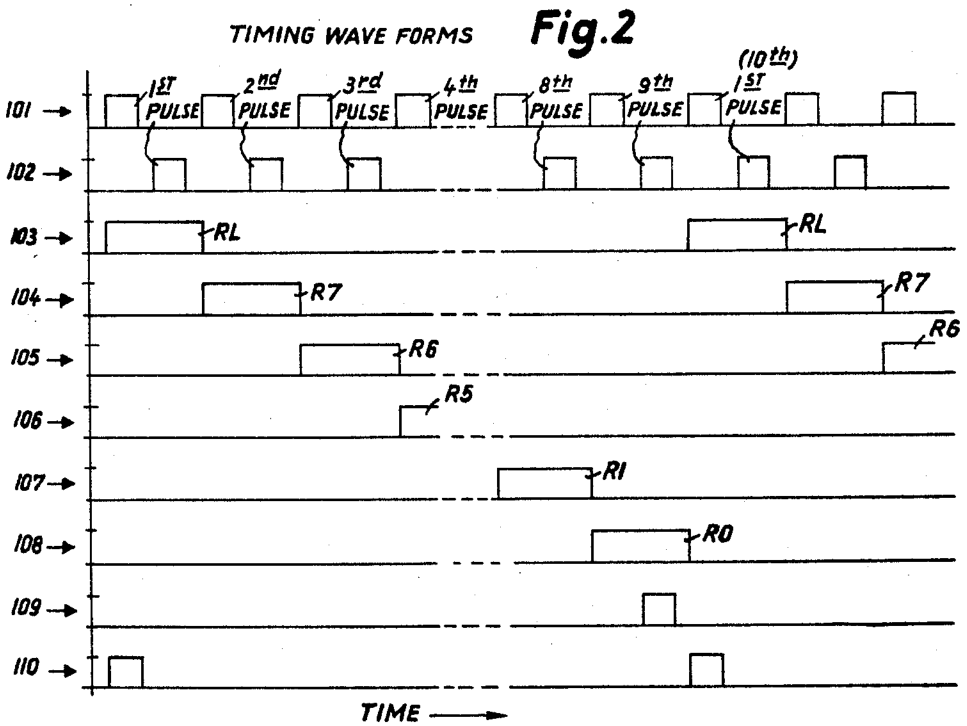

Referring now to the drawings and more particularly to FIGURES 1 and 2, the entire operation of the apparatus is controlled by a master clock or timing pulse generator 100, shown in block form at the lower left-hand corner of FIGURE 1. In accordance with conventional operations, this timing pulse generator 100 emits a series of rectangular pulses 101 and 102 on respective output conductors. The wave form and time relationships between the output pulses 101 and 102 are shown in FIGURE 2. It will be seen, for example, that the first rectangular pulse is emitted in the pulse series 101 and at the expiration of that pulse the first pulse 102 is emitted from the timing pulse generator 100. These pulses, as will be shown, control the operating sequences of the various components of the entire system.

The binary number to be transformed to a decimal number is manually entered into the apparatus by means of the switch 10. In FIGURE 1, it can be seen that the switch 10 has eight separate switch elements 11, each of which can be placed in either an open or a closed position. Each of the switch elements 11 of the switch 10 corresponds to a respective position of the binary number as indicated. The most significant bit is $2^7$, the next is $2^6$, the third is $2^5$, until finally, as shown, the least significant bit is $2^0$. Accordingly, with the illustrated number of switch elements 11, the switch 10 can be utilized for a binary number having eight bits.

In the illustrated example, the binary numeral 01101101 will be used. Accordingly, the switch elements 11 are shown in the proper position for such binary numbers, i.e., the switch element 11 in open position, such as that shown in the $2^7$ position, corresponds to the binary 0, and the switch element 11 in closed position corresponds to the binary 1, such as shown in the $2^6$ position.

A ring counter 20 is connected to the input of the switch elements of the switch 10. The ring counter 20 comprises a series of nine ring stages, identified, respectively, at R0, R1, R2, R3, R4, R5, R6, R7 and RL. In accordance with normal operation of a ring counter, each stage of the ring counter is placed in condition to generate a rectangular output pulse for a preselected time interval, and at the end of such preselected time interval, the stage returns to its non-operative position while simultaneously tripping the next succeeding stage to render the same operative. This arrangement of wave forms thus produced is shown in FIGURE 2. The wave form 103, corresponding to the output pulse emitted on conductor 12 from the output of the ring counter stage RL, is applied on output conductor 12 to the stage R7 of the ring counter 20 and accordingly causes the stage R7 to produce the wave form 104 when a pulse of wave form 101 is applied thereto. As each stage of the ring counter returns to inoperative condition, it switches on the output pulse from the next stage so that, respectively, the output from ring counter stage R6 is 105, that from ring counter stage R5 is 106, and so forth until the output from ring counter stage R1 is 107 and that from R0 is 108.

The timing pulses 101 are applied to each of the ring counter stages by means of conductor 21. The pulses 101 applied on conductor 21 will trigger whichever respective ring counter stage is in operative condition, as shown by the wave forms in FIGURE 2. Therefore, when, for example, the third timing pulse 101 is applied to the conductor 21, it can be seen, in FIGURE 2, that this corresponds in time with the operative condition shown by the wave form 105 corresponding to the ring counter stage R6. Accordingly, this rectangular pulse will be emitted from the ring counter stage R6 and the closed switch element 11 corresponding to the $2^6$ position through an output diode 13 to the input conductor 14 from the switch 10.

In accordance with this arrangement, a positive voltage on the input conductor 14 corresponds to binary 1 while a zero voltage corresponds to binary 0. As will be seen, a convenient voltage to use is +12 volts for binary 1 and zero voltage for binary 0.

From time to time in the specification, the terms "binary 1," "positive voltage," and "12 volts" will be used, each indicating the same physical operation. Similarly, "zero voltage," "ground potential," and "binary 0" will have equivalent meanings.

The pulses applied on the input conductor 14 are applied to a units shift register 30. The units shift register 30 is made up of four storage elements 31, 32, 33 and 34, and four intermediate storage elements 36, 37, 38 and 39. The storage elements 31, 32, 33 and 34 store bits of information in the $2^0$, $2^1$, $2^2$ and $2^3$ positions, respectively, of the binary coded decimal number to be produced in the units shift register corresponding to the units decade of such number.

It can be seen that the input conductor 14 serves to apply the bits of information corresponding to the binary number to the units shift register 30, and, more particularly, to the first storage element 31. A second input conductor 16 to the shift register 30 has the wave forms 101 applied thereto, and a third input conductor 17 of the shift register 30 has the wave forms 102 applied thereto.

It will further be seen that the pulses represented by the wave form 101 are applied simultaneously on input conductor 16 to the four storage elements 31, 32, 33 and 34. Also, the rectangular pulses corresponding to the wave form 102 are applied on the input conductor 17 and simultaneously to the four intermediate storage elements 36, 37, 38 and 39.

In the shift register 30, each storage element 31–34 is, respectively, connected to each intermediate storage element 36–39. Therefore, a conductor 41 is provided for carrying the output from the storage element 31 to the intermediate storage element 36; from storage element 32 to intermediate storage element 37 there is a conductor 42; from storage element 33 to intermediate storage element 38 there is a conductor 43; and, finally, from storage element 34 to intermediate storage element 39 there is a conductor 44.

Each of the intermediate storage elements 36–39 has an output conductor which is connected to a subtraction matrix 40. The intermediate storage element 36 has an output conductor 46; the intermediate storage element 37 has an output conductor 47; the intermediate storage element 38 has an output conductor 48; and the intermediate storage element 39 has an output conductor 49.

The subtraction matrix 40 has three output conductors 52, 53, 54, connected, respectively, to storage elements 32, 33 and 34.

The shift register 30 has one more input conductor 18 which is connected to each of the storage elements 31–34 and to each of the intermediate storage elements 36–39. Also, each of the storage elements 31–34 is connected, respectively, to an individual output stage of the output register 50. Thus, the storage element 31 is connected via conductor 61 to the output stage 71 of the output register 50; the storage element 32 is connected via conductor 62 to the output stage 72; the storage element 33 is connected via conductor 63 to the output stage 73; and the storage element 34 is connected via conductor 64 to the output stage 74.

The subtraction matrix 40 has one additional output conductor 51 connected to the tens shift register 80 and specifically to the first storage element 81 thereon. It will be seen that the tens shift register 80 has four storage elements and four intermediate storage elements arranged in the same manner as the units shift register 30. Connected to the output of the shift register 80 is a second subtraction matrix 60 which is similar to the units subtraction matrix 40, as will be explained below. An output conductor 56 from this subtraction matrix 60 is applied to the hundreds shift register 70 which, in turn, has four storage elements and three intermediate storage elements.

The tens shift register 80 has the wave form 101 applied thereto by way of an input conductor 82 and the wave form 102 applied thereto by way of an input conductor 83. The hundreds shift register 70 has the wave form 101 applied thereto by way of an input conductor 84 and the 102 wave form applied thereto by way of an input conductor 86.

Connected to the output of the tens shift register 80 is the tens output register 90 and connected to the output of the hundreds shift register 70 is the hundreds output register 110.

Finally, connected to the output of the units output register 50 is the units binary to decimal decoder 120; connected to the tens output register 90 is the tens binary to decimal decoder 130, and connected to the hundreds output register 110 is the hundreds binary to decimal decoder 140.

Each of the respective elements of the various registers, matrices and decoders will be discussed in detail, but first, in order to enable a better understanding of the operation of the apparatus and the methods practiced thereby, a binary number used for illustrative purposes will be traced through the circuit.

For this illustrative example, the following binary number will be converted into its corresponding decimal number.

| Binary | | | | | | | | | Decimal | | |
|---|---|---|---|---|---|---|---|---|---|---|---|
| $2^7$ | $2^6$ | $2^5$ | $2^4$ | $2^3$ | $2^2$ | $2^1$ | $2^0$ | = | H | T | U |
| 0 | 1 | 1 | 0 | 1 | 1 | 0 | 1 | | 1 | 0 | 9 |

To begin the transformation, the switch elements 11 of the switch 10 are operated so that the elements 11 corresponding to the binary positions $2^6$, $2^5$, $2^3$, $2^2$ and $2^0$ are closed, as illustrated. The remaining switch elements 11 remain in the open position. Also, the registers 30, 80 and 70 are so arranged that all of the storage elements have the binary 0 stored therein. This is accomplished at the first pulse of the wave forms 101 and 102, where, in FIGURE 2, it can be seen that the ring counter stage RL is operating so that a positive pulse is applied to the input conductor 18 of the register 30, to the input conductor 19 of the register 80, and to the input-conductor 91 of the register 70. The binary information appearing in the storage elements and intermediate storage elements of the shift registers 30, 80 and 70, is thereby represented as follows:

| In 30 | | In 80 | | In 70 | |
|---|---|---|---|---|---|
| 31. = 0, | 36. = 0 | 0 | 0 | 0 | 0 |
| 32. = 0, | 37. = 0 | 0 | 0 | 0 | 0 |
| 33. = 0, | 38. = 0 | 0 | 0 | 0 | 0 |
| 34. = 0, | 39. = 0 | 0 | 0 | 0 | 0 |

Similarly, no potential appears on the output conductors of the subtraction matrices 40 and 60; this corresponds to the binary 0. The output conductors for the subtraction matrix 40 are conductors 51, 52, 53 and 54, and the equivalent un-numbered conductors of subtraction matrix 60. The operation will now be set forth, indicating what occurs as each of the rectangular pulses of the wave forms 101 and 102 is generated by the timing pulse generator 100 and applied simultaneously to the various conductors previously indicated.

*The first pulse of wave form 101.*—This has no effect on the shift registers 30, 80 and 70, as it can be seen that the ring counter stage RL is operating during this time period and is utilized for the purpose of resetting any previously stored information from all of the storage elements and intermediate storage elements of the respective shift registers.

*The first pulse of wave form 102.*—This pulse occurs during the same operating time period of the ring counter stage RL and likewise has no effect.

*The second pulse of wave form 101.*—This is applied to the input conductor 21 of the ring counter 20. The ring counter stage RL has become inoperative, and ring counter stage R7 operative. Accordingly, the output from the ring counter stage R7 is applied to the switch 10 corresponding to the binary position $2^7$. Since, in the illustrative example, the switch element 11 at this position is open for the binary 0, no output pulse is applied to the conductor 14 and again the storage elements of the shift registers 30, 80 and 70 are not changed.

*The second pulse of wave form 102.*—This is used for transposing the information appearing in the intermediate storage elements to the subtraction matrices and since this information in all of the intermediate storage elements is the binary 0, no transformation is carried out.

*The third pulse of wave form 101.*—The stage R7 of ring counter 20 is inoperative and stage R6 is operative. This is best seen in FIGURE 2 where the wave form 105 corresponding to R6 occurs in the same time period as the third pulse of wave form 101 and third pulse of wave form 102. The voltage is applied from the stage R6 to the switch 10 at the binary position $2^6$. Since in this position the switch element 11 is closed, the pulse passes through the diode 13 and appears on the conductor 14. This pulse is applied to the storage element 31 so that at the end of the third pulse of wave form 101, the following is the binary bit storage information in the various storage elements of the shift registers 30, 80 and 70:

| | 30 | 80 | 70 |
|---|---|---|---|
| 31. | = 1 | 0 | 0 |
| 32. | = 0 | 0 | 0 |
| | = 1 (decimal) | = 0 (decimal) | = 0 (decimal) |
| 33. | = 0 | 0 | 0 |
| 34. | = 0 | 0 | 0 |

*The third pulse of wave form 102.*—This pulse is applied on input conductors 17, 83 and 86 of shift registers 30, 80 and 70, respectively, causing any information in the individual storage elements to be transposed to the corresponding intermediate storage elements. Accordingly, the binary bit information on the intermediate storage elements is as follows:

| | 30 | 80 | 70 |
|---|---|---|---|
| 36. | = 1 | 0 | 0 |
| 37. | = 0 | 0 | 0 |
| | = 1 | = 0 | = 0 |
| 38. | = 0 | 0 | 0 |
| 39. | = 0 | 0 | 0 |

The input of the subtraction matrices 40 and 60 will have the following information applied thereto:

| | 40 | 60 |
|---|---|---|
| 46. | = 1 | 0 |
| 47. | = 0 | 0 |
| | = 1 | = 0 |
| 48. | = 0 | 0 |
| 49. | = 0 | 0 |

The output of the subtraction matrices 40 and 60 will have the following information appearing thereon:

| | 40 | 60 |
|---|---|---|
| 52. | = 1 | 0 |
| 53. | = 0 | 0 |
| 54. | = 0 | 0 |
| 51. | = 0 | 0 |

The values appearing on the output conductors 52, 53 and 54 are applied to the storage elements 32, 33 and 34, respectively, of the units shift register 30.

Accordingly, the information now stored in the storage elements of register 30 is:

| | |
|---|---|
| 32. | = 1 |
| | = 2 |
| 33. | = 0 |
| 34. | = 0 |

Therefore, the binary 1 has been shifted from element 30 to element 31. This effectively doubled the value of the binary coded decimal number stored in the register 30 without considering the new value to be added to element 31.

*The fourth pulse of wave form 101.*—This is applied to the storage elements of the shift registers 30, 80 and 70 and to the ring counter 20. The stage R6 of the ring counter 20 is placed in inoperative condition and the stage R5 becomes operative, the wave form relationship being shown in FIGURE 2 with the wave form 106 corresponding to the stage R5 of the ring counter 20.

The pulse applied from the stage R5 is applied to the switch 10 at the $2^5$ position and since in this position the switch element 11 is closed, for the illustrative example, the positive pulse corresponding to binary 1 is further applied through the corresponding diode 18 to the conductor 14. From the conductor 14 it is applied to the storage element 31. Accordingly, at this time period the following information is stored in the storage elements of the shift registers 30, 80 and 70, respectively:

| | 30 | 80 | 70 |
|---|---|---|---|
| 31. | = 1 | 0 | 0 |
| 32. | = 1 | 0 | 0 |
| | = 3 | = 0 | = 0 |
| 33. | = 0 | 0 | 0 |
| 34. | = 0 | 0 | 0 |

As mentioned above, the pulse which had applied the binary 1 to the storage element 31, corresponding to the $2^6$ position, has been shifted, at the time of the appearance of the fourth pulse in the wave form 101, to the storage element 32, as indicated above.

*The fourth pulse of wave form 102.*—At the end of this applied pulse to the shift registers, the intermediate storage elements of registers 30, 80 and 70 have the following information stored thereon:

| | 30 | 80 | 70 |
|---|---|---|---|
| 36. | = 1 | 0 | 0 |
| 37. | = 1 | 0 | 0 |
| | = 3 | = 0 | = 0 |
| 38. | = 0 | 0 | 0 |
| 39. | = 0 | 0 | 0 |

Applied to the input conductors 46, 47, 48 and 49 of the subtraction matrix 40 and the corresponding conductors of the subtraction matrix 60 is the following digital information:

| | 40 | 60 |
|---|---|---|
| 46. | = 1 | 0 |
| 47. | = 1 | 0 |
| | = 3 | = 0 |
| 48. | = 0 | 0 |
| 49. | = 0 | 0 |

Appearing on the output conductors 52, 53 and 54, 51 of the subtraction matrix 40 and the corresponding conductors of the subtraction matrix 60 is the following information:

| | 40 | 60 |
|---|---|---|
| 52. | = 1 | 0 |
| 53. | = 1 | 0 |
| 54. | = 0 | 0 |
| 51. | = 0 | 0 |

These values, at this time, as can be seen from FIGURE 1, are applied to the input of the storage elements 32, 33 and 34 and the corresponding elements on the shift register 80 so that in the shift register 30 the digital information stored on the storage elements at the end of the fourth pulse of the wave form 102 is as follows:

| | 30 |
|---|---|
| 32. | = 1 |
| | = 6 |
| 33. | = 1 |
| 34. | = 0 |

It will be seen that this corresponds to another multiplication by 2 of the previously stored and shifted information.

*The fifth pulse of wave form 101.*—With this pulse, the binary information appearing on output conductors 52, 53 and 54 of subtraction matrix 40 is, respectively, transposed to the storage elements 32, 33 and 34. At the same time, the stage R4 of the ring counter 20 becomes operative, thereby permitting the application of the output pulse to the corresponding switch element of the binary digital position $2^4$. Since this is binary 0, the value 0 appears on the conductor 14 and is applied to the storage element 31. At this time, the following is the condition of the digital information stored in the various storage elements of the shift registers 30, 80 and 70:

| | 30 | 80 | 70 |
|---|---|---|---|
| 31. | = 0 | 0 | 0 |
| 32. | = 1 | 0 | 0 |
| | = 6 | = 0 | = 0 |
| 33. | = 1 | 0 | 0 |
| 34. | = 0 | 0 | 0 |

It will be seen that at the event of the third pulse of the wave form 101, the binary 1 is applied to the input of the storage element 31 of the register 30. At the fourth pulse of the wave form 101, this binary 1 was transposed into the storage element 32 and now, with the fifth pulse of the wave form 101, this binary 1 has now been shifted to the storage element 33 of the shift register 30.

*The fifth pulse of wave form 102.*—As indicated above, this shifts the information from the storage elements in the various shift registers to their intermediate storage elements so that the following is the digital information now stored in each of the intermediate storage elements of the shift registers:

| | 30 | 80 | 70 |
|---|---|---|---|
| 36. | = 0 | 0 | 0 |
| 37. | = 1 | 0 | 0 |
| 38. | = 1 | 0 | 0 |
| 39. | = 0 | 0 | 0 |
| | = 6 | = 0 | = 0 |

The digital information presented on the input conductors to the subtraction matrices 40 and 60 is indicated as follows:

| | 40 | 60 |
|---|---|---|
| 46. | = 0 | 0 |
| 47. | = 1 | 0 |
| 48. | = 1 | 0 |
| 49. | = 0 | 0 |
| | = 6 | = 0 |

As long as the result of the computation in a shift register is less than the number 10, the subtraction matrices 40 and 60 operate so that whatever information is applied to the input conductor is directly applied to its respective output conductor. For example, whatever information is applied on conductor 46 of matrix 40 is immediately applied to the output conductor 52 with no further operation thereon. Furthermore, in each of these cases, the outputs on the respecive output conductors 51 and 56 of the matrices 40 and 60 are also 0. However, if the result in the respective shift register is greater than 9, then the number 5 would be subtracted in the corresponding subtraction matrix from the number which is to be doubled as part of the transformation operation. In such case, the output conductors 51 or 56 of the respective matrix 40 or 60 would then have thereon the binary 1.

The number 6 which, in binary coded decimal presentation, would equal 0110, would be applied to the input of the subtraction matrix 40. A result of doubling such number would be the number 12 which equals, in the binary coded decimal presentation, 1100 applied to the input of the storage elements 32, 33 and 34, with no consideration being given to the value in the next highest decade position of the binary coded decimal number. This result, of course, would be greater than 9. At this time, the subtraction matrix 40 becomes effective and transforms the decimal number 6 into the decimal number 1 which, in binary coded decimal presentation, is 0001, and this decimal number 1 is applied via the output conductors 52, 53 and 54 of the matrix 40 to the storage elements 32, 33 and 34, respectively. Therefore, on the output conductors of the subtraction matrices 40 and 60 appears the following digital information:

| | 40 | 60 |
|---|---|---|
| 52. | = 1 | 0 |
| 53. | = 0 | 0 |
| 54. | = 0 | 0 |

On the output conductors 51 of the matrix 40, there appears the binary 1. The values from the output conductors 52, 53 and 54 are applied to the storage elements 32, 33, 34, respectively, so that the following condition is present:

| | 30 |
|---|---|
| 32. | = 1 |
| 33. | = 0 |
| 34. | = 0 |
| | = 2 |

This corresponds to the doubling of the number 1.

*The sixth pulse of wave form 101.*—At the occurrence of this pulse, the values set forth above are applied to the storage elements of the units shift register 30, the stage R4 of the ring counter 20 becomes inoperative, and the output pulse appears from the stage R3. This is applied to the $2^3$ position of the switch 10 and since in this position the switch element 11 is closed, the binary 1 is applied to the storage element 31. At this instant, the information appearing in the storage elements of the shift registers 30, 80 and 70 is:

| | 30 | 80 | 70 |
|---|---|---|---|
| 31. | = 1 | 1 | 0 |
| 32. | = 1 | 0 | 0 |
| 33. | = 0 | 0 | 0 |
| 34. | = 0 | 0 | 0 |
| | = 3 | = 1 | = 0 |

The storage element 81 of the shift register 80 has the binary 1 applied thereto from the subtraction matrix 40 on the output conductor 51.

*The sixth pulse of wave form 102.*—The values set forth above are shifted to the intermediate storage elements and to the inputs of the subtraction matrices, so that the following digital information appears on the output conductors of the subtraction matrices:

| | 40 | 60 |
|---|---|---|
| 52. | = 1 | 1 |
| 53. | = 1 | 0 |
| 54. | = 0 | 0 |
| 51. | = 0 | 0 |

*The seventh pulse of wave form 101.*—The above values are applied to the respective storage elements. The stage R3 of the ring counter 20 becomes inoperative and the stage R2 becomes operative and applies a positive pulse to the switch 10, in the $2^2$ position. The switch element 11 is closed in this position and, accordingly, the binary 1 is applied on the conductor 14 to the storage element 31. Thus, the digital information in the shift registers is now as follows:

| | 30 | 80 | 70 |
|---|---|---|---|
| 31. | = 1 | 0 | 0 |
| 32. | = 1 | 1 | 0 |
| 33. | = 1 | 0 | 0 |
| 34. | = 0 | 0 | 0 |
| | = 7 | = 2 | = 0 |

*The seventh pulse of wave form 102.*—This shifts the information from the storage elements set forth above to the intermediate storage elements and applies on the input to the respective subtraction matrices 40 and 60 the following digital information:

| | 40 | 60 |
|---|---|---|
| 46. | = 1 | 0 |
| 47. | = 1 | 1 |
| 48. | = 1 | 0 |
| 49. | = 0 | 0 |
| | = 7 | = 2 |

The result of the doubling in the units shift register 30 would again be 7×2(+1 or +0) which would also be larger than 9. Thus, by means of the subtraction matrix 40, the number 5 is subtracted from the number 7 so that the following information appears on the output conductors of the subtraction matrices:

| | 40 | 60 |
|---|---|---|
| 52. | = 0 | 0 |
| 53. | = 1 | 1 |
| 54. | = 0 | 0 |
| 51. | = 1 | 0 |

*The eighth pulse of wave form 101.*—The above information is applied to the storage elements in the respective shift registers. The ring counter stage R2 becomes inoperative and the stage R1 operative. The binary 1 is applied to the switch 10 in the $2^1$ position. Since this is 0, the following information is present in these registers at this instant:

| | 30 | | 80 | | 70 | |
|---|---|---|---|---|---|---|
| 31. | = 0 | | 1 | | 0 | |
| 32. | = 0 | = 4 | 0 | = 5 | 0 | = 0 |
| 33. | = 1 | | 1 | | 0 | |
| 34. | = 0 | | 0 | | 0 | |

*The eighth pulse of wave form 102.*—At the appearance of this pulse, the information set forth above is shifted to the intermediate storage elements. Therefore, at the input of the subtraction matrices appears the following information:

| | 40 | 60 |
|---|---|---|
| 46. | = 0 | 1 |
| 47. | = 0 | 0 |
| 48. | = 1 | 1 |
| 49. | = 0 | 0 |

It should be noted that at this instant, the value appearing in the storage elements of the shift register 80 is the value 5 so that with the usual multiplication by 2, carried out by the eighth pulse of the wave form 101, and the eighth pulse of the wave form 102, the value to be stored in the shift register 80 would be 10 or 11, depending on what the bit of the next binary position will be. In either event, the result in this shift register would be greater than 9. Accordingly, the subtraction matrix 60 goes into operation and subtracts the value 5 from the value in the shift register so that the result in the shift register 80, instead of 10 or 11, will be either 0 or 1, depending upon what value is to be applied to the first storage element.

At this instant, at the output of the subtraction matrices the following digital information appears:

| | 40 | 60 |
|---|---|---|
| 52. | = 0 | 0 |
| 53. | = 0 | 0 |
| 54. | = 1 | 0 |
| 51. | = 0 | 1 |

*The ninth pulse of wave form 101.*—At this instant, the values appearing on the output conductor of the respective subtraction matrices are applied to the respective storage elements. The stage R1 of the ring counter 20 becomes inoperative and the stage R0 operative. This applies a positive pulse to the switch 10 in the binary position $2^0$ and since the switch element 11 is closed in this position, the binary 1 appears on the conductor 14 so that the following is the digital information stored in the shift registers at this instant:

| | 30 | | 80 | | 70 | |
|---|---|---|---|---|---|---|
| 31. | = 1 | | 0 | | 1 | |
| 32. | = 0 | = 9 | 0 | = 0 | 0 | = 1 |
| 33. | = 0 | | 0 | | 0 | |
| 34. | = 1 | | 0 | | 0 | |

*The ninth pulse of wave form 102.*—At the same time it should be noted in FIGURE 1 that the output from the ring counter stage R0, in addition to being applied to the binary position $2^0$ of the switch 10, is also applied on the conductor 111 to an AND-circuit 150. It can further be seen that the wave form 102 is also applied to the AND-circuit 150 on a conductor 112. Thus, appearing on the output conductor 113 of the AND-circuit 150 is the wave form 109 shown in FIGURE 2. This wave form 109 will be produced in the same time period when there is a coincidence between the wave form 102 and the wave form 108. This occurs during the operation of the stage R0 of the ring counter 20.

The wave form 109 is applied on conductor 113 to the output stages 71, 72, 73 and 74 of the output register 50, and simultaneously to the equivalent output stages in the output registers 90 and 110. Thus, the information appearing in the storage elements 31, 32, 33 and 34 of the units shift register 30 is applied to the output stages 71, 72, 73 and 74, respectively, and furthermore, this appears on the output conductors 114, 116, 117 and 118 of the output register 50.

Similarly, whatever information has been stored in the storage elements 80 is shifted to the output stages in the tens register 90 and the information in the storage elements of the shift register 70 is shifted to the output stages of the hundreds output register 110 and to the respective output conductors.

Thus, for the illustrative example, the following is the binary digital information applied to the binary to decimal decoders 120, 130 and 140 from their respective output registers:

| | 50 | | 90 | | 110 | |
|---|---|---|---|---|---|---|
| 114. | = 1 | | 0 | | 1 | |
| 116. | = 0 | = 9 | 0 | = 0 | 0 | = 1 |
| 117. | = 0 | | 0 | | 0 | |
| 118. | = 1 | | 0 | | 0 | |

It will be seen that each of the shift registers has applied to the output register a number using four bits. This corresponds to a binary coded decimal number wherein a particular decade of the decimal number is represented in binary information. Thus, at the output of the output register 50, the binary number 1001 corresponds to the decimal number 9, the digital number 0000 corresponds to the decimal number 0, and the digital number 0001 corresponds to the decimal number 1. In decimal form, this is written as decimal number "109."

*The tenth pulse of wave form 101.*—The stage R0 of the ring counter 20 is rendered inoperative and the stage RL is rendered operative. This produces from the stage RL the above-mentioned pulse 103 which also appears on conductor 115, and, when applied to the conductors 18, 19 and 91 of the various shift registers, serves as a resetting pulse to return all of the storage elements and intermediate storage elements to the binary 0 position. At this instant, a new binary to decimal conversion can be carried out depending on whatever number is inserted in the switch 10 of FIGURE 1. The values to be set up in the output registers 50, 90 and 110 and their respective binary to decimal decoders 120, 130 and 140 then depends on the generation of the next wave form 109.

Thus, it has been demonstrated that the apparatus of FIGURE 1 can be used to obtain the decimal number which corresponds to the binary number having eight bits. The operating sequence is controlled by the timing pulse generator 100. This is a conventional master clock generator, the arrangement of which is not presented in order to avoid unnecessarily complicating the drawings. The operation of each of the various elements of the block diagrams of the device has been demonstrated. In order to indicate the decimal number that is the result of the operation of the apparatus set forth in FIGURE 1, a decade indicator such as that shown in FIGURE 6 may be used.

Figure 6:
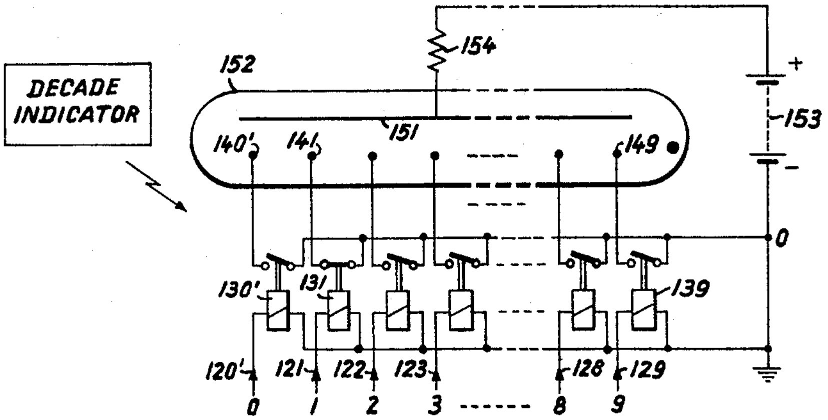
FIGURE 6 is a decade indicator which is connected to the decoders of FIGURE 1 for displaying the produced decimal number.

Referring to FIGURE 6, it will be seen that ten input conductors 120′, 121 . . . 129 are provided. These input conductors correspond, respectively, to the similarly numbered output conductors of the binary to decimal decoders 120 of FIGURE 1. Each conductor is connected to one side of a respective relay, 130′, 131 . . . 139. It will be seen that the other side of the winding of each relay is connected to ground potential. The armature of the relays 130′, 131 . . . 139 provide conducting paths between respective cathodes 140′, 141 . . . 149 to ground when the armature is closed.

The relay 131 is shown in the armature closed position, corresponding to the numeral 1, and the cathode 141. In this position, the cathode 141 has ground potential applied thereto and the anode 151 of the gas-filled decade indicator tube 152 has the potential of the battery 153 applied thereto. When the potential between the anode 151 and the cathode 141 is sufficiently high, the tube breaks down and the respective cathode 141 is illuminated. The current flowing between cathode and anode 151 determines the brightness, the amount of current being limited by the anode resistor 154.

Each of the cathodes 140′, 141 . . . 149 is arranged in the form of a particular numeral. The cathode 140′ is arranged in the form of the numeral "0"; the cathode 141 in the form of the numeral "1", etc., until cathode 149 is arranged in the form of the numeral "9." By using a decade indicator, such as 152, for each of the decades of the decimal number to be presented, it is clear that the decimal number produced by the apparatus of FIGURE 1 can readily be indicated and read out.

After having reviewed hereinabove the various components of the apparatus in block form, typical elements which may be used to carry out the described operation will now be set forth.

Figure 3:
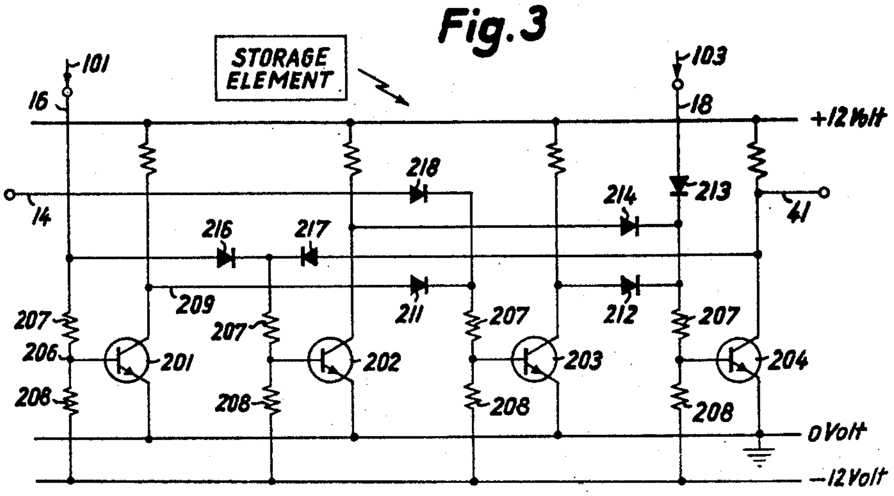
FIGURE 3 is an electrical schematic diagram of a storage element which is represented in block form in FIGURE 1.

In FIGURE 3, a suitable storage element is shown, which may be utilized as any one of the storage elements or intermediate storage elements of the shift registers 30, 80 or 70. Such a storage element includes four phase reversing transistor amplifiers 201, 202, 203 and 204. The base electrode of each of the transistors 201–204 is, respectively, connected to the junction 206 between two voltage-dividing resistors 207 and 208. The voltage dividers are arranged so that when an input signal equal to 0 volts is applied to the base electrode, the voltage on the base electrode of the npn transistor is negative and the respective transistor is blocked. When the input signal applied to the base electrode is equal to +12 volts, the voltage on the base electrode becomes slightly positive so that the transistor to which the 12 volts is applied becomes conductive. The output voltage of each transistor in its blocked position is +12 volts, corresponding to the binary 1, and in the conductive condition the output voltage is 0, corresponding to the binary 0.

For illustrative purposes, let it be assumed that the storage element shown in FIGURE 3 is the storage element 31 of the shift register 30. Accordingly, one of the input conductors would be conductor 16 to which the wave form 101 is applied. Another input conductor would be the conductor 18 to which the resetting pulses are applied from the ring counter stage RL of the ring counter 20 of FIGURE 1.

If the potential on conductors 16 and 18 is equal to zero, which would be equivalent to the wave form 101 being zero and the output of the stage RL being zero, then the transistor 201 would be in blocked condition and would have on its output conductor 209 the potential 12 volts, corresponding to the binary 1. In this way, the diode 211 connected between the transistor 201 and the transistor 203 would be open and in conducting condition regardless of whether or not the bit of the binary appearing on the input conductor 14 were 0 or 1.

The output voltage of the transistor 203 is therefore zero so that the diode 212 connected between the transistor 203 and the transistor 204 is in blocked condition. Since the voltage appearing on the conductor 18 is zero, the diode 213 is also in blocked condition and accordingly the conducting condition of the transistor 204 is now determined solely by the conducting condition of the diode 214. This diode transmits the output voltage from the transistor 202 to the transistor 204.

Since, as has been set forth above, the voltage appearing on the conductor 16 is zero, the diode 216 is also blocked and has no effect on the control of the conducting condition of the transistor 202. With the aforesaid arrangements, the transistors 202 and 204 are coupled to each other by means of diodes 217 and 214 and form a bistable multivibrator circuit, which multivibrator circuit cannot be controlled by external conditions, due to the fact that the diode 216 and the diode 212 are in blocked condition.

The conducting condition of the multivibrator circuit made up of transistors 202 and 204 is determined by the conditions that existed prior to the present circumstances, so that when the voltages on conductors 16 and 18 are both zero, there will appear on the output conductor 41 of the storage element in FIGURE 3 the binary 0 or 1, depending on whether the transistor 202 or 204 is the one conducting. As is well known, only one of the two multivibrator elements of a multivibrator circuit will be in conducting condition and the other will be in blocked condition.

If now the wave form 101, which is applied to the conductor 16, has formed the rectangular pulse equal to +12 volts and applied the same to the conductor 16, then the transistor 201 will go from the blocked or non-conducting condition to its conducting condition and the transistor 202 will similarly be conducting due to the diode 216. The output voltage from the transistor 201 will now be zero and since this is applied on conductor 209, the diode 211 will be blocked so that the conducting condition of the transistor 203 will now be dependent solely upon the input signal which is applied to the input conductor 14.

Similarly, the output voltage of the transistor 202 will be zero and the diode 214 will be blocked. From this fact and the fact that the potential applied to conductor 18 is zero, blocking the diode 213, the conducting condition of the transistor 204 will now be determined solely by the diode 212. In this case, wherein the voltage applied to the input conductor 16 is equivalent to the binary 1, the voltage applied to the input conductor 14 will be further applied directly by means of the diode 218 to the transistor 203 and the output of the transistor 203 will control the transistor 204 directly by means of the diode 212.

By means of the two stage phase reversals in the transistors 203 and 204, the potential appearing on the output conductor 41 from the transistor 204 will be in the same phase relationship as the potential applied to the input conductor 14. Thus, when a positive pulse is applied on the conductor 16 and zero voltage is applied to the conductor 18, the storage element of FIGURE 3 will have appearing on its output conductor 41 exactly the same signal as that applied on the input conductor 14. If the potentials on the input conductors 16 and 18 are both zero, then the element will retain on its output conductor 41 the same value that it previously had.

If the resetting signal is now applied to the conductor 18, the transistor 204 will become non-conducting by means of the diode 213 regardless of the potential being applied to the input conductors 14 and 16; therefore, the potential appearing on the output conductor 41 will be zero. Accordingly, by means of the resetting signal applied to the conductor 18, when the waveform 101 is also zero, whatever signal has been stored in the storage element can automatically be made zero and everything is reset in the storage element. Thus, the various conditions necessary to fulfill the operations set forth hereinabove with respect to the circuit of FIGURE 1 have been demonstrated for the storage element shown in FIGURE 3.

Figure 4:
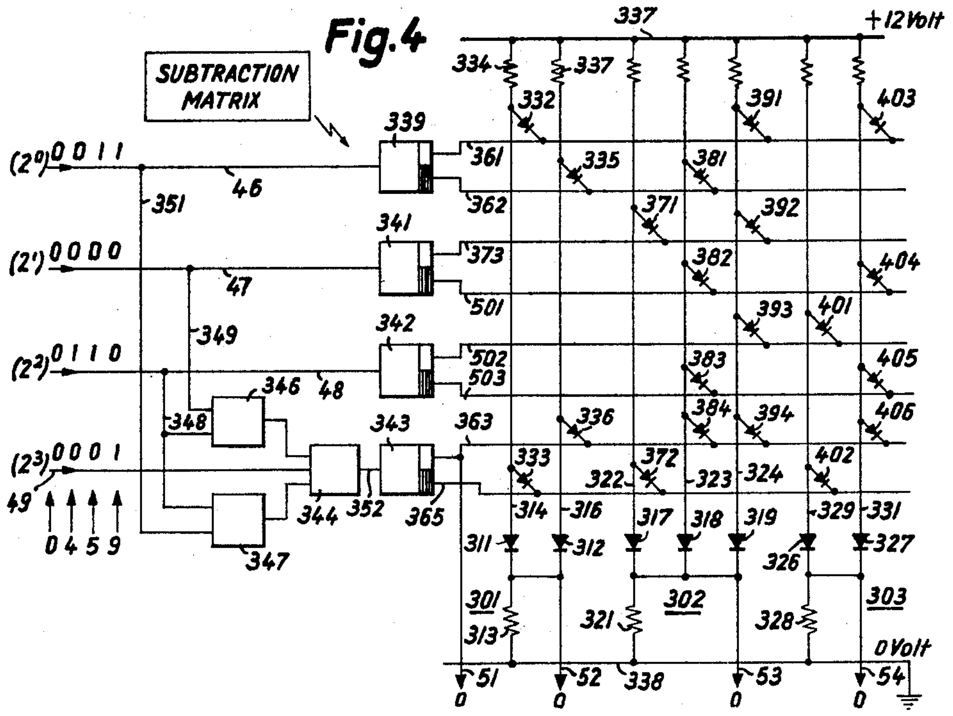
FIGURE 4 is an electrical schematic diagram of a subtraction matrix used in the arrangement of FIGURE 1.

Referring now to FIGURE 4, the same shows the operating arrangement of the subtraction matrix used for each of the subtraction matrices 40 and 60. The numbering of the conductors and elements of the subtraction matrix 40 corresponds to a similar numbering of FIGURE 1. The subtraction matrix in FIGURE 4 includes at the lower output end thereof three OR-stages 301, 302 and 303. The OR-stage 301 includes two diodes 311 and 312, a resistor 313, and the input conductors 314 and 316.

The OR-stage 302 includes three diodes 317, 318 and 319, a resistor 321, and input conductors 322, 323 and 324.

The OR-stage 303 includes two diodes 326, 327, a resistor 328 and two input conductors 329 and 331.

Connected to the respective input conductors of the OR-stages 301, 302 and 303 are AND-stages which are similarly made up of diodes and resistors. Connected to the conductor 314 are the diodes 332 and 333 of the first AND-stage and the resistor 334 thereof. Further on the input conductor 316 of the OR-stage 301 are the diodes 335 and 336, and the resistor 337.

The remaining AND-circuits connected to the respective OR-stages 302 and 303 can be seen in FIGURE 4.

The resistors of all of the AND-stages are connected to a conductor 337 which is connected to a positive potential, such as 12 volts. The resistors 313, 321 and 328 of the OR-stages each have one end thereof connected to a conductor 338 which is at ground or zero potential.

The inputs to the diodes of the AND-stage are connected with the outputs of switching stages 339, 341, 342 and 343. These twitching circuits which can be bistable transistor switching circuits have applied thereto the input from the shift registers. Each of these switching circuits produces for a particular input signal two simultaneously occurring output signals. One of the output signals is equal to the input signal and the other output signal is the input signal inverted. Thus, for an input signal binary 0, the stage produces on its upper output conductor the signal binary 0, and on its lower illustrated output conductor the signal binary 1. If the input signal binary is binary 1, the outputs are reversed.

The switching circuits 339, 341 and 342 have applied thereto directly to the output from the shift registers appearing on 46, 47 and 48. The switching circuit 343, however, is provided for the purpose of producing the output signal on conductor 51 which depends on all four input signals appearing on conductors 46–49, respectively. It further depends on the condition of an OR-stage 344 which is connected directly to the input of the circuit 343. To the input of the OR-stage 344 are connected the outputs of two AND-stages 246 and 347. The input conductor 48 is connected by means of conductor 348 to both of the AND-stages. The conductor 47 is connected by means of conductor 349 to the AND-stage 346 and the conductor 46 is connected by means of conductor 351 to the other AND-stage 347. It will further be seen that the conductor 49 is directly connected to the third input of the OR-circui 344.

As has been explained above, the four bits appearing on the output conductors 46, 47, 48 and 49 represent a binary coded decimal number with the outputs respectively corresponding to the $2^0$, $2^1$, $2^2$ and $2^3$ positions of the binary coded decimal number then being stored in the storage elements 31–34 of FIGURE 1.

As will be presently demonstrated, the purpose of this arrangement is to permit the direct passage of certain ones of the binary coded decimal numbers through the subtraction matrix without any operation thereby and to cause others to have the binary coded decimal number 5 subtracted therefrom. For the binary coded decimal numbers 0, 1, 2, 3 and 4, the portions appearing on conductors 48, 47 and 46 vary from 000 to 100. The application of such numbers to the subtraction matrix shown in FIGURE 4 will cause these numbers to pass directly to the respective output conductors 54, 53 and 51. At the same time, the portions of such numbers appearing on input conductor 49 are 0 and do not change the output on conductor 51.

In order to describe this, two illustrative examples will be provided, namely, the binary coded decimal numbers 0 and 4. For the binary coded decimal number 0 applied to the subtraction matrix in FIGURE 4, the bits 0000 will be applied to the input conductors 49, 48, 47 and 46. With a binary 0 on each of the inputs 46, 47 and 48, it will be seen that the inputs to both of the AND-circuits 346 and 347 will be binary 0. Accordingly, the output signals therefrom will each be binary 0. Similarly, with a binary 0 on conductor 49, the input to the OR-circuit 344 will also be binary 0. In this manner, all three input signals to the OR-stage 344 will be binary 0. Thus, the output from the OR-stage appearing on the conductor 352 will also be binary 0. The switching circuits 339–343, to which the input signals 0000 appearing on conductors 46, 47, 48 and 352 are respectively applied, each produce two output signals as follows: (*a*) the signals on the upper output conductors 332, 373, 502 and 363=binary 0, and (*b*) the signals on the lower output conductors 362, 501, 503 and 365 =binary 1.

These signals appearing on the output conductors are then further applied to the various diodes and resistors making up the AND-circuits of the subtraction matrix so as to produce in combination with the OR-circuits 301, 302 and 303, on the output of the subtraction matrix, the desired output signals on conductors 52, 53 and 54.

For the example given, the binary 0 or zero potential appearing on output conductor 361 of the switching circuit 339 will be applied to the lower terminal of the diode 332. The binary 1, or a 12 volt potential, appearing on output conductor 365 of the switching stage 343, will be applied to the lower terminal of the diode 333.

The other sides of the diodes 332 and 333 are applied to conductor 314 which is further connected through the resistor 334 to the positive conductor 337. Accordingly, the diode 333 is blocked while the diode 332 is open, so that current flows through the resistor 334 in such a manner that the output conductor 314 of the first AND-stage just described will have zero potential thereon.

The second output conductor 363 from the switching circuit 339 having binary 1 or 12 volt potential applied thereon is connected to the diode 336, while the second output conductor 363 of the switching circuit 343 having 0 potential thereon is connected to the diode 335. With this arrangement, the diodes 336 and 335 have a similar relationship to the diodes 332 and 333 so that on the output conductor 316 of this AND-stage a zero potential will also appear. Therefore, both input conductors 314 and 316 to the OR-stage 301 will be zero at the same time, and a zero potential will be applied at the upper end of the output resistor 313 of the OR-stage 301. With a zero potential on both sides of this resistor, no current will flow therethrough and zero voltage, corresponding to binary 0, will appear at the output conductor 52 which is connected to the upper terminal of resistor 313.

Referring now to the third vertical conductor 322 of the subtraction matrix representing the third AND-stage, it will be seen that this conductor has diodes 371 and 372 connected thereto. The lower end of the diode 371 is connected to the output conductor 373 of switching circuit 341 which has zero potential thereon, while the lower end of diode 372 is applied to conductor 365 which is the output conductor of switching circuit 343 and which has the potential of 12 volts applied thereto. This AND-stage, accordingly, also produces the input signal 0 to the diode 317 of the second OR-stage 302.

The fourth vertical conductor 323 of the subtraction matrix has four diodes connected thereto, namely, diodes 381, 382, 383 and 384. The potentials applied to the lower end of these four diodes are, respectively, 12 volts, 12 volts, 12 volts, and zero volts. Therefore, the output signal from this AND-stage represented by the conductor 323, which furthermore represents the second input signal to the OR-stage 302, by means of the diode 318, is zero.

The next vertical conductor 324 of the fifth AND-stage of the subtraction matrix has four diodes connected thereto, namely, 391, 392, 393 and 394. The potentials applied to the lower ends of these diodes are, respectively, zero potential, zero potential, zero potential, and zero potential, so that this third input signal to the OR-stage 302 applied on conductor 324 through the diode 319 is also zero. Therefore, all of the input signals to the OR-stage 302 are zero potential so that the output signal appearing on conductor 53 of this stage is also zero.

Continuing to the last OR-stage 303, the sixth AND-stage is connected thereto via conductor 329 which has diodes 401 and 402 connected thereto. The potentials applied to the lower end of these diodes are, respectively, 0 volts and 12 volts so that there is a zero potential on the conductor 329 which is the first input to the OR-stage 303 through the diode 326. Finally, on the seventh and last AND-stage, represented by the conductor 331 and the four diodes 403, 404, 405 and 406, the following potentials are applied to the lower ends of the respective diodes: 0, 12, 12 and 0. Therefore, the potential appearing on the output conductor 331 of this AND-stage representing the second input signal to the OR-stage 303, through diode 327, is also zero. Accordingly, the output of this OR-stage 303, appearing on conductor 54 is also zero.

Summing up, therefore, for the binary coded digital number 0 input conductors 46, 47 and 48 have 000 applied thereto and the corresponding output conductors 52, 53, 54 each has the binary 0 applied thereto. Since, for the binary coded decimal number 0, the conductor 49 has the binary 0 applied thereto, the output on conductor 51 is binary 0. Although it appears that the number 0000 applied to the matrix 40 has passed through the matrix unchanged, this can be considered the equivalent of subtracting the number 0000 from the applied number.

For the second illustrative example, the binary coded decimal number 4 is chosen which in binary coded decimal form is 0100. In this case, the zero potential is applied to input conductors 46, 47 and 49, while the binary 1 or 12 volts is applied to the input conductor 48. Also, it will be seen that the two AND-stages 346 and 347 have the potential 12 volts applied on their common input conductor 348. The second input signal to the AND-circuit 346 and the AND-circuit 347 is zero, since they are connected, respectively, to input conductors 47 and 46. Therefore, the output signals from both of the AND-circuits are zero. These outputs are applied directly to the OR-stage 344.

The third input signal to the OR-stage 344 is the zero voltage which appears on the input conductor 49. With all three input signals applied to the OR-stage 344 being zero, the output signal on conductor 352 applied to switching circuit 343 will be zero. This produces on the output conductor 51 from the switching circuit 343 the output signal zero.

With the indicated applied voltages, the switching circuits 339–343 have the following outputs: For 339, the potential on conductor 361 is zero, and on conductor 362, it is 12 volts; for circuit 341, the potential on conductor 373 is zero, and on conductor 501, it is 12 volts; for switching circuit 342, the potential appearing on conductor 502 is 12 volts, and on conductor 503, it is zero; and, finally, on switching circuit 343, the potential on output conductor 363 is zero, and on conductor 365, it is 12 volts. These values are applied to the AND-stages and OR-stages made up of the diodes and resistors of the subtraction matrix to produce the combined output signals appearing on conductors 51, 52, 53 and 54.

Starting again with the first AND-stage represented by conductor 314, it will be seen that this AND-stage will produce the output signal zero due to the fact that the lower end of the diode 322 will have zero potential applied thereto, while the lower end of the diode 333 will have the potential of 12 volts applied thereto.

The next AND-stage represented by the conductor 316 will produce the output signal zero since the lower ends of the diodes 335 and 336 will have applied thereto the potential of 12 volts and zero volts, respectively. These two input signals to the OR-stage 301 being zero, the output appearing on output conductor 52 will also be zero.

Proceeding to the next or third AND-stage represented by the conductor 322, the lower ends of the diodes 371 and 372 will have the potentials of zero and 12 volts, respectively, applied thereto, producing an input signal zero through the diode 317 to the OR-stage 302.

The next AND-stage represented by the conductor 323 will have at the lower ends of the diodes 381–384 the following potentials: 12 volts, 12 volts, zero volts, and zero volts. This will produce a second input signal zero to the OR-stage 302 through the diode 318.

The next or fifth AND-stage is represented by the conductor 324 and the four diodes 391–394. The lower ends of these diodes will have, respectively, applied thereto the potential zero, zero, 12, and zero, thereby producing a zero input signal to the OR-stage 302 through the diode 319.

All three input signals to the OR-stage 302 being zero, the output signal appearing on conductor 53 from this OR-stage will also be zero.

The next AND-stage represented by the conductor 329 and the diodes 401 and 402 will have at the lower ends of the diode 401, the potential 12 volts, and the diode 402, the potential 12 volts. Accordingly, this will produce a 12 volt input signal 326 of the OR-stage 303. The final AND-circuit represented by the conductor 331 and the four diodes 403–406 will have connected at the lower ends of the respective diodes the following potentials: zero, 12, zero, and zero. This will produce the input signal zero to the diode 327 or the OR-stage 303. The two signals of 12 volts and zero volts are applied to the OR-stage 303, and this will produce on the output conductor 54 of the OR-stage the potential of 12 volts.

It will, therefore, be seen that the values 1, 0, 0 applied, respectively, to the conductors 48, 47 and 46, will be transmitted through the subtraction matrix so that at the output of the respective output conductors 54, 53 and 52 will be the values 1, 0, 0. Furthermore, appearing on the output conductor 51 will be the value 0. Again, this corresponds to the subtraction of the binary coded decimal number 0.

Accordingly, as has been demonstrated hereinabove for the binary coded decimal numbers 0 (0000) and 4 (0100), the values will be transmitted directly through the subtraction matrix. The same is true for the binary coded decimal numbers 1 (0001), 2 (0010), and 3 (0011).

It should further be pointed out that the bits corresponding to the binary coded decimal numbers 0 to 4 which pass through the matrix 40 unchanged actually are reapplied from the matrix to the next highest storage elements in the shift register 30 so that the binary coded decimal number now stored in the register 30 has been shifted to the next highest position and thus has been doubled.

In accordance with the algorism that has been set up for the computation incorporating the principles of the present invention, it is clear that if a number has been introduced into the shift register 30 which when multiplied by 2 would be larger than 9, then the subtraction matrix must change its operation. Therefore, if a binary coded decimal number between 5 (0101) and 9 (1001) is introduced into the shift register 30, the subsequent multiplication by 2 would produce a number between 10 and 18. As pointed out above, this multiplication by 2 is produced within the storage register 30 by the shifting of the stored bits in the storage elements through the intermediate storage elements and matrix 40 back into the next highest storage element in the shift register.

Accordingly, in such a situation, the subtraction matrix 40 must produce on its output conductors 54, 53 and 52 the respective portions of the binary coded decimal numbers 0–4 for applied numbers 5–9. This effectively is a subtraction by the binary coded decimal number 5.

Furthermore, the subtraction matrix 40 must produce on its output conductor 51 the binary 1 (equal to 12 volts) which will be applied to the storage element 81 of the shift register 80 of the next highest decade. This signal appearing on the output conductor 51, equal to the binary 1, effectively provides a carry-over to the next highest decade of the binary coded decimal number to be produced. The respective portions of the binary coded decimal numbers 0–4, which appear on the output conductors 54, 53 and 52 of the subtraction matrix 40 in place of the numbers 5–9 which have been applied thereto, are multiplied by 2 in the conventional manner in the shift register by being shifted to the next highest storage element. In this way, both of the decades of the binary coded decimal numbers have been properly arranged in the binary coded system. For example, the number 8 doubled would give the result of 16. In operation, the subtraction matrix and the shift register produce the number 1 on the output conductor 51 and double the number 3 which is applied back to the shift register 30 so that there is a 6 in the units shift register and a ten in the tens shift register resulting in the number 16.

The above computation procedure will be further illustrated with reference to two specific examples, namely, the numbers 5 and 9.

Starting with the binary coded decimal number 5, the binary equivalent is 0101. These bits are respectively applied to the input conductors 49, 48, 47 and 46 of the subtraction matrix illustrated in FIGURE 4. With this arrangement, the following potentials appear on the output conductors of the switching circuits 339–343: On conductor 361, 12 volts; on conductor 362, 0 volts; on conductor 373, 0 volts; on conductor 501, 12 volts; on conductor 502, 12 volts; on conductor 503, 0 volts; on conductor 363, 0 volts; and on conductor 365, 12 volts.

With the input on conductor 47 equalling zero and the input on conductor 48 equalling 1, the output of the AND-circuit 346 equals zero. With the input on the conductor 46 equalling 1 and the input on the conductor 48 equalling 1, the output signal from the AND-circuit 347 will equal 1. Accordingly, the OR-stage 344 will produce the output signal binary 1.

Proceeding as before through the AND-stages of the subtraction matrix, the lower terminal of the diode 332 will have the value 12 volts applied thereto, while the lower terminal of the diode 333 will have the value zero applied thereto. Accordingly, on the output conductor 314, the value zero will appear. In the next AND-stage including conductor 316, the lower end of the diode 335 will have the value zero applied thereto, while the lower end of the diode 336 will have the value 12 volts applied thereto, providing the output voltage zero on conductor 316.

Both of the inputs to the OR-stage 301 being zero, the output from the OR-stage 301 appearing on conductor 52 will be zero.

In the next AND-stage including conductor 322, the potential on the lower end of diode 371 will equal zero. while the potential on the lower end of diode 372 will also equal zero. This provides an output voltage of zero on the condutcor 332. In the next AND-stage including the conductor 323, the lower end of the diode 381 will have the potential zero applied thereto; the lower end of diode 382 will have the potential 12 volts applied thereto; the lower end of diode 383 will have the potential zero applied thereto; and the lower end of diode 384 will have the potential 12 volts applied thereto. Accordingly, applied on conductor 323 will be the potential zero.

In the next AND-stage including the output conductor 324, the lower end of diode 391 will have 12 volts applied thereto; the lower end of diode 392 will have zero volts applied thereto; the lower end of diode 393 will have 12 volts applied thereto; and the lower end of diode 394 will have zero volts applied thereto. Accordingly, on the output conductor 324 will be applied the potential zero.

With all three inputs being applied to the OR-stage 302 equalling zero potential, the output on the conductor 53 will be zero potential.

In the next AND-stage, the lower end of diode 401 will have the potential of 12 volts applied thereto, while the lower end of diode 402 will have the potential zero applied thereto. This will produce on the output conductor 329 of the next AND-stage the value zero.

Finally, in the last AND-stage of the subtraction matrix, including the conductor 321, the lower end of diode 403 will have the potential 12 volts applied thereto; diode 404 will have the potential 12 volts applied thereto; diode 405 will have the potential zero volts applied thereto; and diode 406 will have the potential 12 volts applied thereto. This combination produces on the conductor 331 the output potential zero. Since both of the inputh to the diodes 326 and 327 of the OR-stage 303 equal zero, it is evident that the output on conductor 54 will also be zero.

Summarizing the above, it is seen that the outputs on each of the above output conductors 52, 53 and 54 equal the number 0, even though the applied value 0101 (number 5) has been applied. Therefore, it is evident that the number 5 has been transformed, as far as the shift register 30 is concerned, into the number 0. Furthermore, the output on conductor 51 which is connected directly to conductor 363 is 12 volts equal to the binary 1 so that the binary 1 is transferred into the first storage element of the shift register 80, which is the tens shift register. This corresponds to the carry to the next register.

As a second illustrative example, the binary coded decimal number 9 equivalent to 1001 will be applied to the input conductors 49, 48, 47 and 46. In this case, the OR-stage 344 is controlled by the 12 volts equal to the binary 1 applied on conductor 49 so that the output appearing on 352 is equal to 12 volts. Accordingly, the potentials on the output conductors of the switching circuits 339–343 are as follows: on conductor 361, 12 volts; on conductor 362, zero volts; on conductor 373, zero volts; on conductor 501, 12 volts; on conductor 502, zero volts; on conductor 503, 12 volts; on conductor 363, 12 volts; and on conductor 365, zero volts.

Going once again through the subtraction matrix, the output of the first AND-stage conductor 314 will be zero since the diode 332 has a potential 12 volts applied thereto, while the diode 333 has the zero potential applied thereto. The output conductor 316 of the next AND-stage will be zero since the diode 335 has zero potential applied thereto, while the diode 336 has 12 volts applied thereto. Therefore, with the two inputs to the OR-stage 301 being zero, the output on conductor 52 will also be zero.

In the next AND-stage, the output on conductor 332 will be zero since the potential on diode 371 will be zero, while the potential of diode 372 will also be zero.

In the next AND-stage, the output potential on conductor 323 will be zero since the lower end of diode 381 will have zero volts applied thereto; diode 382 will have 12 volts applied thereto; diode 383 will have 12 volts applied thereto; and diode 384 will have 12 volts applied thereto. The third AND-stage feeding into the OR-stage 302 will have the value zero on the output conductor 324 since the lower end of diode 391 will have 12 volts applied thereto; the lower end of diode 392 will have zero volts applied thereto; the lower end of diode 393 will have zero volts applied thereto; and the lower end of diode 394 will have 12 volts applied thereto.

Since all of the inputs to the diodes 317, 318 and 319 of the OR-stage 302 have zero potential, it is evident that the output on conductor 53 will also be zero.

Proceeding now to the last OR-stage 303, the output on conductor 329 will have the zero potential applied thereon since the lower end of diode 401 will have zero volts applied thereto; and the lower end of diode 402 will have zero volts applied thereto. However, on the output conductor 331 of the next AND-stage, the potential of 12 volts will appear. This results from the lower end of diode 403 being connected to 12 volts; the lower end of diode 404 being connected to 12 volts; the lower end of diode 405 being connected to 12 volts; and, finally, the lower end of diode 406 being connected to 12 volts. All of the lower ends of these diodes being connected to 12 volts, it is evident that the output voltage on conductor 331 will be 12 volts.

Therefore, the voltage applied through diode 336 to the OR-stage 303 will be zero, while the voltage applied through conductor 331 to the OR-stage 303 will be 12 volts producing on the output conductor 54 the output voltage 12 volts.

To review, the output on conductor 52 was 0 volts (0), the output on conductor 53 was 0 volts (0), and the output on conductor 54 was 12 volts (1). This is equivalent to the respective portion of the binary coded decimal number 100, equal to the respective portion of the binary coded decimal number 4 which has been produced from the binary coded number 1001, or the binary coded decimal number 9. It is therefore seen that the number 9 applied to the input of the subtraction matrix of FIGURE 4 will product the output number 4. Furthermore, on the output conductor 51 will appear the output potential 12 volts which is applied to the next shift register 80 to be stored in the first storage element 81. This accomplishes the necessary carry for the multiplication which has a product larger than ten.

The transformation for the numbers 6 (0110); 7 (0111); and 8 (1000) are carried out in the same manner. From these respective numbers are produced on the output conductors 54, 53 and 52 the respective portions of the binary coded decimal number 1 (001); the number 2 (010); and the number 3 (011). Each time, the binary 1 equal to the voltage of 12 volts will appear on the output conductor 51.

Thus, for each number between 5 and 9 applied to the storage matrix 40 from the shift register 30 of FIGURE 1, a number will be fed back to the shift register which corresponds to the number applied less 5. At the same time, a carry will occur into the tens shift register 80. Similarly, the subtraction matrix 60 operates in the same manner with respect to the shift register 80 to produce the next carry into the hundreds decade represented by the hundreds shift register 70.

Summing up the operation of the subtraction matrix in FIGURE 4, it is evident that if the binary coded decimal numbers 0–4 are applied to the input of the subtraction matrix, the binary coded decimal number 0 (0000) is subtracted therefrom and the three least significant portions appear on the output conductors and are applied back to the next higher order position in the shift register 30 to produce the multiplication by 2. The output on conductor 51 is also zero for each of these numbers.

If, on the other hand, the numbers 5–9 are applied to the input conductors 48, 47 and 46, then the respective portions of the numbers 0–4 will appear on the output conductors 54, 53 and 52 by means of a combination of values represented by the binaries 0 or 1. This represents the number 5 (0101) subtracted from the input number applied. At the same time, the potential appearing on the output conductor 51 will always be 12 volts, corresponding to the binary 1.

Figure 5:
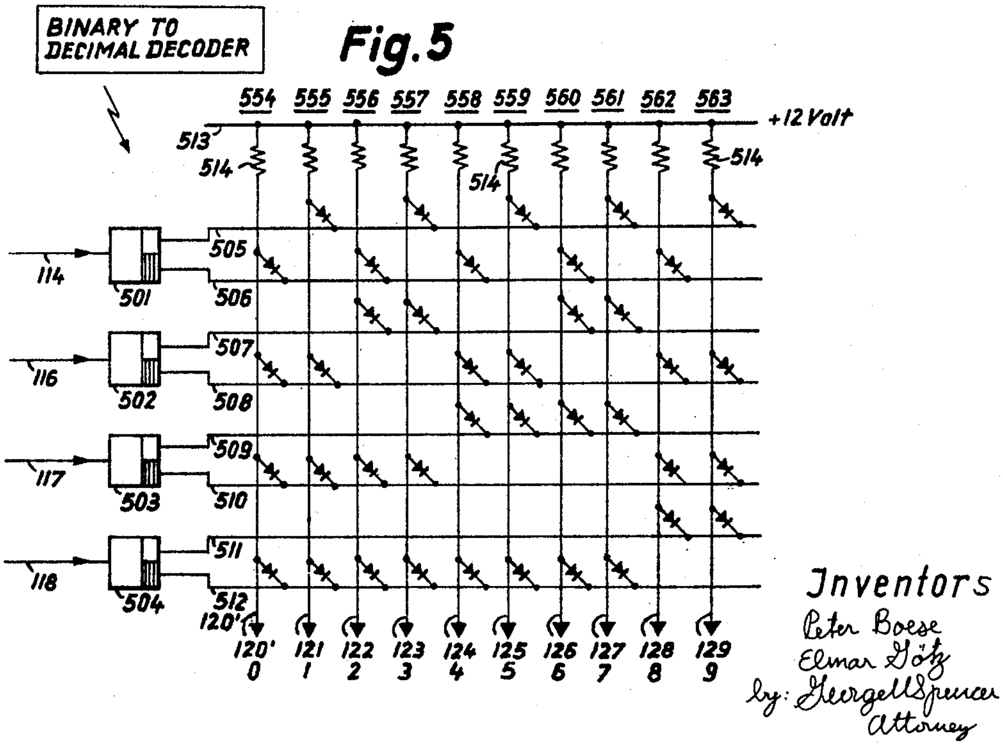
FIGURE 5 is an electrical schematic diagram of a binary to decimal decoder which is also represented in block form in FIGURE 1.

Referring now to FIGURE 5, there is shown a circuit for the binary to decimal decoder such as that used for decoders 120, 130 and 140 of FIGURE 1. The numbering of the decoder will correspond to the unit binary to decimal decoder 120 of FIGURE 1. The inputs appearing on input conductors 114, 116, 117 and 118 are those equivalent to the outputs from the output register 50 which is the unit output register. The function of the binary to decimal decoder is to convert the binary coded decimal number from the unit output register into the decimal number output on its output conductors 120′–129.

The decoder in FIGURE 5 includes four switching circuits 501, 502, 503 and 504. As before, with respect to FIGURE 4, these switching circuits each have two output conductors. For example, switching circuit 501 has an output conductor 505 on which appears the signal which is equal to the signal appearing on conductor 114, and a conductor 506 on which appears the input signal inverted. Similarly, the signal which is the equivalent of the signal appearing on the respective input conductor for the switching circuit appears on conductors 507, 509 and 511, and the inverted signals appear on conductors 508, 510 and 512.

The decoder is a matrix having ten AND-stages 554–563. As will be seen from FIGURE 5, each of the AND-circuits is connected to a positive potential conductor 513 (12 volts) and is connected from such positive conductor directly to the output conductor 120′–129, through respective resistors 514. Furthermore, each AND-circuit has four diodes connected therein.

Starting with the production of the decimal number 0, the same is formed from the binary coded decimal number 0000, each bit of which is respectively applied to the four input conductors 114, 116, 117 and 118.

It will be seen that with such input, only the AND-stage 54 will have an output of 12 volts occurring on the output conductor 120′ since the lower ends of the four diodes in the AND-stage 554 are all connected to 12 volts. All of the rest of the AND-stages have at least the lower end of one of the diodes connected to zero potential for this input. Therefore, the decoder will provide an output only on the conductor corresponding to zero; this being applied in FIGURE 6 to the relay 130′ will light up the numeral 0 in the decade indicator shown in FIGURE 6.

If the binary coded decimal number 1001 equivalent to the decimal number 9 is applied to the input conductors of the decoder of FIGURE 5, the only AND-stage which will produce a positive output voltage will be AND-stage 563 since only the lower ends of the diodes of this AND-stage will be connected to the positive potential of 12 volts. All of the remaining AND-stages will have at least one of its diodes connected to zero.

Similarly, going through the various AND-stages 555–562, if the binary coded decimal numbers corresponding to the decimal numbers 2–8 are applied respectively to the input conductors of the decoder, the corresponding output will appear only on one of the output conductors 120′–129, depending on the particular arrangements of the zero and +12 potentials.

All of the remaining output conductors will be zero and only one will have a positive potential at any one time.

Referring once again to FIGURE 1, the output stages in the output registers 50, 90 and 110 are constructed in the same manner as the storage elements and intermediate storage elements of the shift registers, which circuit arrangement has been described with respect to FIGURE 3. The only difference is that there is no conductor 18, such as that shown in FIGURE 3, for resetting the storage elements to 0. Thus, for example, the output register stage 71 of the output register 50 would have the input conductor 113 equivalent to the input conductor 14 in FIGURE 3. The input conductor 61 to stage 71 would be equivalent to the input conductor 16 in FIGURE 3, and the output conductor 114 of output register stage 71 would be equivalent to the output conductor 41 of FIGURE 3. The rest of the circuit arrangement would be identical.

The ring counter arrangement 20 of FIGURE 1, as has been mentioned above, is wholly conventional and can be constructed in any one of a number of different known ways. Accordingly, a detailed description of such a conventional ring counter will not be required.

Also, as mentioned above, the timing pulse generator 100 which produces the wave forms 101 and 102 of FIGURE 2 is of conventional arrangement. It can be produced by the application of an alternating sine wave to the input conductors 601 of a transformer 602. A half-wave rectification can produce two spaced half-wave forms which are 180° out of phase with each other. These are utilized to control the bistable switching circuits 603 of the timing pulse generator. The switching circuits 603 will produce output pulses of preselected amplitudes. It is apparent from FIGURE 2 that these output pulses are all rectangular pulses which are spaced from each other depending on the input sine wave frequency.

If desired, an alternate input stage arrangement may be used for obviating the manually operable switch 10 of FIGURE 1. Such alternate arrangement is shown in FIGURE 7 and is a completely electric parallel to series converter which can be used in place of the ring counter 20 and switch 10 of FIGURE 1.

Figure 7:
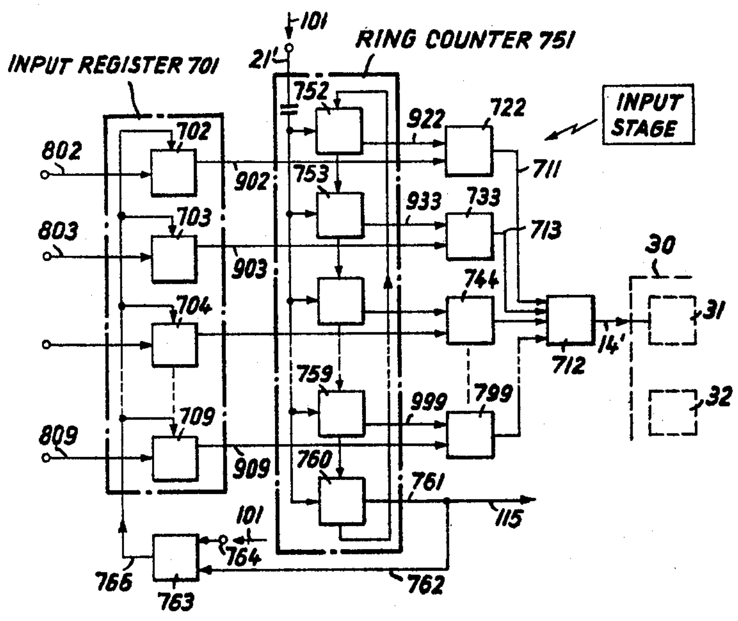
FIGURE 7 is an electrical schematic diagram of an alternative input stage which can be utilized in place of the input stage illustrated in FIGURE 1.

The converter of FIGURE 7 includes an input register within the dotted outline 701. The register has eight storage elements 702, 703, 704, 705, 706, 707, 708 and 709.

Each of the storage elements 702–709 has an input conductor respectively connected thereto. Thus, storage element 702 has input conductor 802; storage element 703 has an input conductor 803; . . . and storage element 709 has an input conductor 809 connected thereto.

Furthermore, storage element 702 has an output conductor 902 connected to an AND-stage 722; storage element 703 has an output conductor 903 connected to an AND-stage 733; . . . and storage element 709 has an output conductor 909 connected to an AND-stage 799.

The separate stages of a ring counter, indicated by the dotted line 751, are connected to the other inputs of the AND-stages 722–799. Thus, the AND-stage 722 has as its other input the conductor 922 connected to the output of the ring counter stage 752; AND-stage 733 has the other end of its input conductor 933 connected to the output of the ring stage 753; . . . and the last AND-stage 799 has connected to its second input conductor 999 the stage 759 of the ring counter 751.

The stages of the ring counter 751 all have their inputs connected to the conductor 21′ which has applied thereto the wave form 101 shown in FIGURE 2. In this manner, the ring counter 751 sequentially removes the information stored in the storage elements 702–709, starting with the ring counter stage 752 and the storage element 702 corresponding to the most significant bit.

If, for example, the binary 0 is stored in the storage element 702, this value will be applied to one of the inputs of the AND-stage 722. When the stage 752 of the ring counter 751 is operative, the other inputs to the AND-stage 722 will have the value equivalent to the binary 1 or 12 volts.

With an input of zero and an input of 1 to the input of the AND-stage 722, the output appearing on output conductor 711 will be zero. This is applied to the OR-stage 712. Since at this time all of the other six stages of the ring counter 751 will not be in operative condition, it is apparent that their outputs will all be zero. Accordingly, all of the inputs to the OR-stage 712 will be zero. Therefore, the binary 0 will appear at the output of the OR-stage 712 on the input conductor 14′, which is equivalent to the input conductor 14 of FIGURE 1. As before, this value will be applied to the first storage element 31 of the units shift register 30 of FIGURE 1.

With the next pulse of the wave form 101, the ring counter stage 752 will become inoperative and the ring counter stage 753 will be operative. The output of ring counter stage 753 on conductor 933 will equal the binary 1. If, at this time, the binary 1 were stored in the storage element 703, then values corresponding to the bits 1 and 1 would be applied to the input of the AND-stage 722. This produces the binary 1 on the output of the AND-stage 733, and this value is applied on conductor 713 to the OR-stage 712. All of the other seven conductors applied to the OR-stage will have zero thereon, as before, and accordingly the output of the OR-stage 712 on conductor 14′ will have the binary 1. This value will be applied to the first storage element of the shift register.

This switching sequential operation of the ring counter elements of the ring counter 751 will continue to introduce the information stored in the storage elements 702–709 into the shift register 30. With the last ring counter stage 709 being operated, all of the respective values from the storage register 701 will have been transferred to the units shift register 30 of FIGURE 1, the tens shift register 80, and the hundreds shift register 70.

Following the operation of the last ring counter element 759, the next pulse of the wave form 101 will switch in the last ring counter stage 760. This is equivalent to the last ring counter stage RL of the ring counter 20 of FIGURE 1 which produces the resetting pulse applied to the conductors 18, 19, and 91 of the shift registers 30, 80 and 70, respectively. As before, such resetting pulse resets all of the digital information stored in the various storage elements of the shift registers to 0 in the manner indicated in FIGURE 3. At the same time, this resetting pulse appearing on output 761 of ring counter stage 60 is also applied on conductor 762 to an AND-stage 763. This AND-stage has the wave form 101 applied to the other of its inputs 764. At the time coincidence of the wave form 103 of FIGURE 2 corresponding to the output on conductor 761 of ring counter stage 760 with the wave form 101, the AND-circuit 763 will emit on its output conductor 766 a pulse such as that shown in the wave form 110 of FIGURE 2. This pulse is applied to the storage elements 702–709 of the register 701.

It will be seen from the representative wave forms of FIGURE 2 that the pulses of wave form 110 appear in time before the beginning of the operation cycle of the ring counter 751 which actually starts with the wave form 104. In this manner, the storage elements of the input register 701 are set to receive the next binary number which is to be converted to a decimal number. The time relationship is therefore arranged such that the binary number set forth in the input register 701 is not changed during the operation cycle of the ring counter 751.

It is thus seen that with the apparatus shown in FIGURE 1 using the input stage illustrated in either FIGURE 1 or FIGURE 7, it is possible to set up a binary number corresponding to eight bits of information, or more, if the switching circuits are so arranged. The binary number will automatically be transferred into the shift registers and moved through the respective shift registers in the proper time sequence to produce from the output of each shift register a binary coded decimal number. The binary coded decimal number which is thus produced in each shift register is applied to the output register for its respective decade. From the output register, it is applied to the binary to decimal decoder in the proper decade to produce the actual decimal number at the output of the decoder. In the foregoing example, the decimal number 109 was produced from the eight position binary number 01101101. This has been accomplished with the use of far fewer elements than would be required by the conventional diode matrices arrangement.

It will be understood that the above description of the present invention is susceptible to various modifications, changes and adaptations, and the same are intended to be comprehended within the meaning and range of equivalents of the appended claims.

For example, the outputs of the various registers and matrices may be applied to the input register of a printing or writing device or to a punching mechanism.

We claim:

1. In apparatus for converting a binary number having a plurality of bits of information into a binary coded decimal number having a multiplicity of binary coded decades, the combination which comprises: a plurality of shift registers, each of said registers corresponding respectively to one of the decades of the binary coded decimal number to be produced; means for sequentially introducing each of the bits of information of the binary number into the $2^0$ position of the first shift register representing the lowest order decade, said bits being introduced in sequence from the most significant bit to the least significant bit; and subtraction means effective each time a bit is so introduced for subtracting the binary coded decimal number 0 from the binary coded decimal number stored in said first shift register when said last-mentioned number is less than 5 and for applying the binary 0 to the second shift register representing the next highest order decade, for subtracting the binary coded decimal number 5 from the binary coded decimal number stored in said first shift register when said last-mentioned number is more than 4 and less than 10 and for applying the binary 1 so said second shift register, and for storing the binary coded decimal number representing the difference of said subtraction in said first shift register, before the next most significant bit is introduced, in such a manner that the value of said last-mentioned binary coded decimal number is doubled.

2. The combination as defined in claim 1 wherein said subtraction means are a plurality of subtraction matrices, each of said matrices being connected respectively between a shift register corresponding to one of the decades of the binary coded decimal number to be produced and a shift register corresponding to the next highest order decade.

3. The combination as defined in claim 1 wherein each of said shift registers includes four binary storage means corresponding respectively to the $2^0$, $2^1$, $2^2$, $2^3$ positions of the binary coded decimal number with the storage means corresponding to the $2^0$ position being connected to the means arranged for applying the bits of information into the decade represented by said respective shift register.

4. The combination claimed in claim 3 wherein each of said binary storage means is connected respectively to one stage of an output register in which is stored the binary coded decimal number for a respective decade at the end of the introduction of the least significant bit into the first shift register.

5. The combination as defined in claim 1 wherein a binary to decimal decoder is arranged for converting the binary coded decimal number produced in said combination into its equivalent decimal number.

6. Apparatus as defined in claim 5 wherein said binary to decimal decoder includes a plurality of AND-stages, each of said AND-stages having four diodes respectively connected to the four bits of the binary coded decimal number to be decoded.

7. The combination claimed in claim 5, further comprising a read-out device capable of displaying the decimal numbers 0–9, said read-out device being connected to the output of said binary to decimal decoder for reading out said decimal number.

8. The combination as defined in claim 1 wherein each of said subtraction means includes at the input thereof four switching stages, three of the stages being connected respectively to the $2^0$, $2_1$ and $2_2$ positions of the binary coded decimal output of one shift register corresponding to one decade of the binary coded decimal number, the fourth stage being connected to the $2^3$ position of said output by means of an OR-stage having two additional inputs, one of said inputs being connected to the output of an AND-stage having its inputs connected to said $2^1$ and $2^2$ positions, the other of said additional inputs being connected to the output of a second AND-stage having its inputs connected to said $2^0$ and $2^2$ positions, said fourth switching stage producing the bit to be applied to the shift register representnig the next highest order decade.

9. The combination claimed in claim 8 wherein said subtraction means includes seven AND-stages connected through three OR-stages to three output conductors representing the $2^0$, $2^1$ and $2^2$ positions to be applied back to said one shift register.

10. The combination as claimed in claim 1 wherein said means for sequentially introducing said bits of information is arranged in the form of a parallel to series converter having a single output to which are connected sequentially the bits of information corresponding to each of the positions of the binary number to be converted.

11. The combination defined in claim 1, further comprising means for automatically resetting each of the elements of the apparatus to zero after the binary coded decimal number is removed from said shift register, whereby after such resetting only the binary zero is stored.

12. In an apparatus for converting a binary number having a plurality of bits of information into a binary coded decimal number having a multiplicity of binary coded decades, the combination which comprises: first means for storing the most significant bit of the binary number in the $2^0$ position of the lowest order binary coded decade; second means for subtracting the binary coded decimal number 0 from the binary coded decimal number stored in said lowest order decade when said last-mentioned number is less than 5 and for generating a binary 0 to carry to the next highest decade; third means for subtracting the binary coded decimal number 5 from the binary coded decimal number stored in said lowest order decade when said last-mentioned number is greater than 4 and less than 10 and for generating a binary 1 to carry to the next highest decade; fourth means for doubling the binary coded decimal number representing the difference of said subtraction and for storing the result in said lowest order decade; and fifth means for actuating said first, second, third, and fourth means for each of the next most signifi,cant bits in order until the least significant bit is stored in said lowest order binary coded decade.

References Cited in the file of this patent

UNITED STATES PATENTS

| | | |
|---|---|---|
| 2,860,327 | Campbell | Nov. 11, 1958 |
| 2,894,686 | Holmes | July 14, 1959 |
| 2,929,556 | Hawkins et al. | Mar. 22, 1960 |